United States Patent
Ye et al.

(10) Patent No.: US 9,971,413 B2
(45) Date of Patent: May 15, 2018

(54) POSITIONING METHOD AND APPARATUS

(71) Applicant: Huawei Technologies Co., Ltd., Shenzhen, Guangdong (CN)

(72) Inventors: Min Ye, Hangzhou (CN); Yuanwang Liu, Shenzhen (CN); Zhen He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 14 days.

(21) Appl. No.: 14/532,749

(22) Filed: Nov. 4, 2014

(65) Prior Publication Data
US 2015/0145765 A1 May 28, 2015

Related U.S. Application Data

(63) Continuation of application No. PCT/CN2014/075008, filed on Apr. 9, 2014.

(30) Foreign Application Priority Data

Nov. 27, 2013 (CN) .......................... 2013 1 0636404

(51) Int. Cl.
*G06F 3/01* (2006.01)
*G06F 3/0484* (2013.01)

(52) U.S. Cl.
CPC .............. *G06F 3/017* (2013.01); *G06F 3/013* (2013.01); *G06F 3/04842* (2013.01)

(58) Field of Classification Search
CPC ........................................................ G06F 3/013
See application file for complete search history.

(56) References Cited

U.S. PATENT DOCUMENTS

| 8,922,480 | B1* | 12/2014 | Freed ...................... G09G 5/00 345/156 |
| 2011/0254865 | A1* | 10/2011 | Yee ......................... G06F 3/013 345/661 |
| 2012/0068941 | A1 | 3/2012 | Arrasvuori et al. |
| 2012/0297341 | A1 | 11/2012 | Glazer et al. |

(Continued)

FOREIGN PATENT DOCUMENTS

| CN | 202043145 U | 11/2011 |
| CN | 102841683 A | 12/2012 |

(Continued)

*Primary Examiner* — Grant Sitta
*Assistant Examiner* — Amen Bogale

(57) ABSTRACT

The present invention discloses a positioning method and apparatus, which relate to the field of computer technologies and may simplify an operation of selecting a target application icon or function button and makes the operation less time-consuming. According to embodiments of the present invention, a gazed area on a screen under the gaze of a user is acquired by detecting a screen gazing operation of the user, a projection area on the screen to be pressed by the user is acquired by detecting the user's hover gesture operation of pressing the screen; when the gazed area does not include the projection area, the user's hover gesture operation of pressing the screen is re-detected to acquire the projection area on the screen to be pressed by the user; when the gazed area includes the projection area, an application icon or a function button included in a match area is processed.

10 Claims, 7 Drawing Sheets

(56) References Cited

U.S. PATENT DOCUMENTS

| | | | | |
|---|---|---|---|---|
| 2013/0054622 A1* | 2/2013 | Karmarkar | ........ | G06F 17/30032 |
| | | | | 707/749 |
| 2013/0135196 A1* | 5/2013 | Park | .......................... | G06F 3/01 |
| | | | | 345/156 |
| 2014/0055337 A1* | 2/2014 | Karlsson | .................. | G06F 3/013 |
| | | | | 345/156 |
| 2014/0139440 A1 | 5/2014 | Qu et al. | | |
| 2014/0181740 A1* | 6/2014 | Gachoka | ............... | G06F 3/0488 |
| | | | | 715/802 |
| 2014/0368442 A1* | 12/2014 | Vahtola | ................... | G06F 3/013 |
| | | | | 345/173 |

FOREIGN PATENT DOCUMENTS

| | | | |
|---|---|---|---|
| CN | 102981764 A | 3/2013 | |
| CN | 103336576 A | 10/2013 | |
| CN | 103631483 A | 3/2014 | |

\* cited by examiner

POSITIONING METHOD AND APPARATUS

CROSS-REFERENCE TO RELATED APPLICATIONS

This application is a continuation of International Application No. PCT/CN2014/075008, filed on Apr. 9, 2014, which claims priority to Chinese Patent Application No. 201310636404.5, filed on Nov. 27, 2013, both of which are hereby incorporated by reference in their entireties.

TECHNICAL FIELD

The present invention relates to the field of computer technologies, and in particular, to a positioning method and apparatus.

BACKGROUND

As a latest type of terminal input equipment, touchscreen is currently the simplest and most convenient human-machine interaction manner. In the prior art, when a terminal screen displays a target application icon or target function button to be selected by a user, a commonly-used method is: the user directly taps, on the terminal screen, the target application icon or target function button to be selected. In a case in which application icons or function buttons are arranged tightly, a user may tap an unexpected icon or button by mistake and select another application icon or function button on the terminal screen. The terminal will then start the selected application icon or function button. In this case, the user will stop the selected application or function, and then tap the to-be-selected target application icon or target function button on the terminal screen. This operation needs to be performed repeatedly until the target application icon or target function button is selected.

In the prior art, however, a user directly taps a to-be-selected target application icon or function button on the screen, which cannot avoid a user from mistakenly selecting an option. When an option is tapped by mistake, an application that is opened or content that is typed, as a result of mistakenly tapping the option, needs to be closed or deleted. The operation is complex and time-consuming, and causes inconvenience to users.

SUMMARY

Embodiments of the present invention provide a positioning method and apparatus, which simplifies an operation of selecting a target application icon or function button and makes the operation less time-consuming.

In a first aspect, an embodiment of the present invention provides a positioning method, including:

detecting a screen gazing operation of a user to acquire a gazed area on a screen under the gaze of the user;

detecting the user's hover gesture operation of pressing the screen to acquire a projection area on the screen to be pressed by the user; and when the gazed area does not include the projection area, re-detecting the user's hover gesture operation of pressing the screen to acquire the projection area on the screen to be pressed by the user; and when the gazed area includes the projection area, processing an application icon or a function button included in a match area, where the match area is the projection area.

With reference to the first aspect, in a first possible implementation manner, after the detecting the user's hover gesture operation of pressing the screen to acquire a projection area on the screen to be pressed by the user, the method further includes:

determining whether the gazed area includes the projection area.

With reference to the first aspect, in a second possible implementation manner, the step of, when the gazed area includes the projection area, processing an application icon or a function button included in a match area, includes:

when the gazed area includes the projection area, determining, according to the match area, the corresponding application icon or function button in the match area; and starting an application program corresponding to the application icon, or displaying content corresponding to the function button.

With reference to the first aspect, in a third possible implementation manner, before the detecting a screen gazing operation of a user to acquire a gazed area on a screen under the gaze of the user, the method further includes:

enabling an eyeball positioning function to acquire the gazed area of the user.

With reference to the third possible implementation manner of the first aspect, in a fourth possible implementation manner, the enabling an eyeball positioning function includes:

when it is detected the user selects an eyeball position function option, enabling the eyeball positioning function; or, sending prompt information to the user, where the prompt information is used to prompt the user to enable the eyeball positioning function; receiving information for enabling the eyeball positioning function from the user; and enabling the eyeball positioning function.

In a second aspect, an embodiment of the present invention provides a positioning apparatus, including:

a first detecting unit, configured to detect a screen gazing operation of a user;

a first acquiring unit, configured to acquire a gazed area of a screen under the gaze of the user;

a second detecting unit, configured to detect the user's hover gesture operation of pressing a screen;

a second acquiring unit, configured to acquire a projection area on the screen to be pressed by a user; where the second detecting unit is further configured to: when the gazed area does not include the projection area, re-detect the user's hover gesture operation of pressing the screen; and the second acquiring unit is further configured to acquire the projection area on the screen to be pressed by the user; and a processing unit, configured to: when the gazed area includes the projection area, process an application icon or a function button included in a match area, where the match area is the projection area.

With reference to the second aspect, in a first possible implementation manner, the apparatus further includes:

a judging unit, configured to determine whether the gazed area includes the projection area.

With reference to the second aspect, in a second possible implementation manner, the processing unit includes:

a determining module, configured to: when the gazed area includes the projection area, determine, according to the match area, the corresponding application icon or function button in the match area; and a processing module, configured to start an application program corresponding to the application icon, or display content corresponding to the function button.

With reference to the second aspect, in a third possible implementation manner, the apparatus further includes:

an enabling unit, configured to enable an eyeball positioning function to acquire the gazed area of the user.

With reference to the third possible implementation manner of the second aspect, in a fourth possible implementation manner, the enabling unit specifically includes:

a detecting module, configured to detect that the user selects an eyeball positioning function option; and an enabling module, configured to enable the eyeball positioning function; or, a sending module, configured to send prompt information to the user, where the prompt information is used to prompt the user to enable the eyeball positioning function; and a receiving module, configured to receive information for enabling the eyeball positioning function from the user, and further configured to enable the eyeball positioning function.

The embodiments of the present invention provide a positioning method and apparatus, where, a gazed area on a screen under the gaze of a user can be acquired by detecting a screen gazing operation of the user; a projection area on the screen to be pressed by the user can be acquired by detecting the user's hover gesture operation of pressing the screen; and when the gazed area does not include the projection area, the user's hover gesture operation of pressing the screen is re-detected to acquire the projection area on the screen to be pressed by the user, and when the gazed area includes the projection area, an application icon or a function button included in a match area is processed. Compared with the prior art, where, when an option is tapped by mistake, an application that is started or content that is typed, as a result of tapping the option by mistake, needs to be stopped or deleted first and then the user's hover gesture operation of pressing the screen is re-detected, the embodiments of the present invention may simplify an operation of selecting a target application icon or function button and make the operation less time-consuming.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
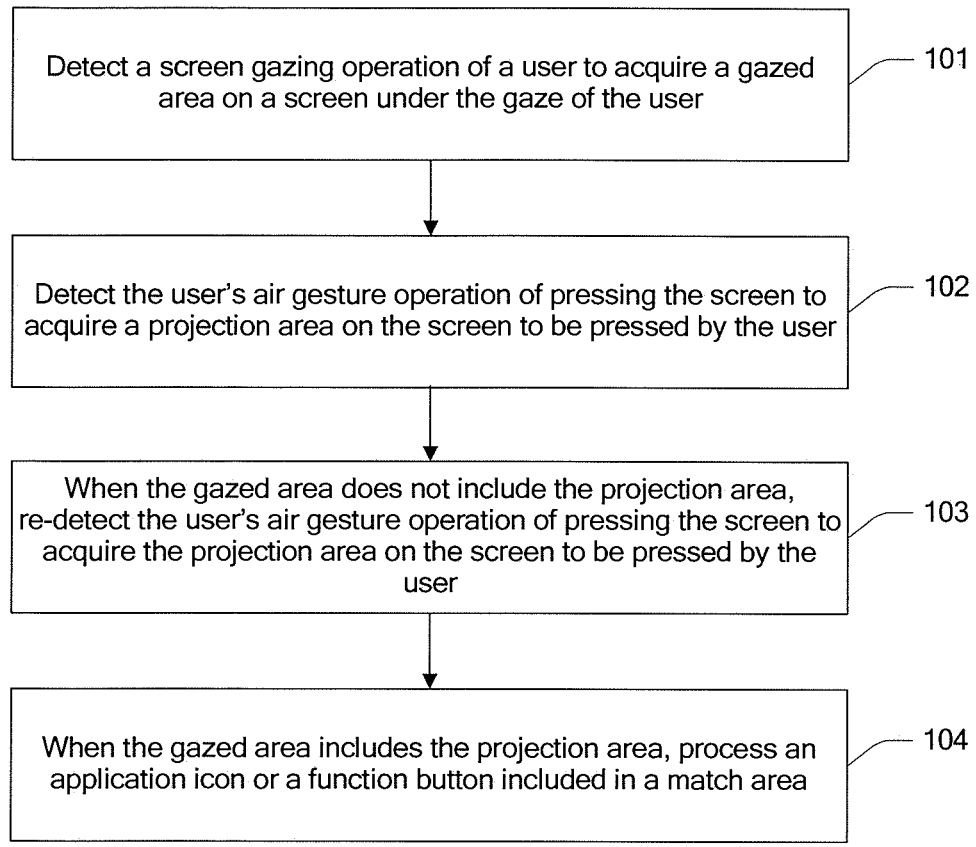
FIG. 1 is a flowchart of a positioning method according to an embodiment of the present invention.

An embodiment of the present invention provides a positioning method executed by a terminal, which may specifically be a mobile phone, tablet computer, player, television, computer, set top box, or another terminal. As shown in FIG. 1, the method includes:

Step 101. Detect a screen gazing operation of a user to acquire a gazed area on a screen under the gaze of the user.

Figure 2A:
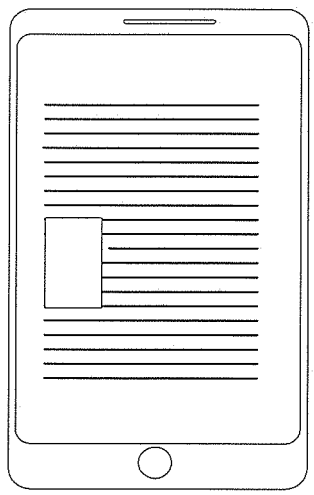
FIG. 2A is a schematic diagram according to another embodiment of the present invention, where content displayed on a screen is web page content.
Figure 2B:
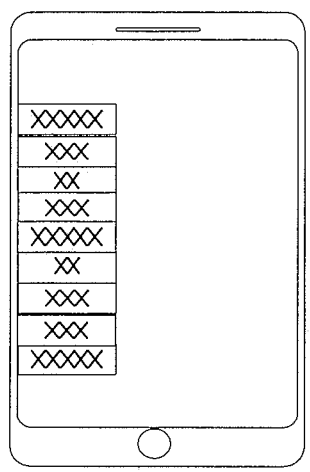
FIG. 2B is a schematic diagram according to another embodiment of the present invention, where content displayed on a screen is a menu list.
Figure 2C:
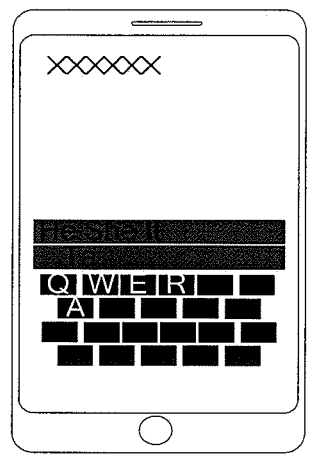
FIG. 2C is a schematic diagram according to another embodiment of the present invention, where content displayed on a screen is entered content.
Figure 2D:
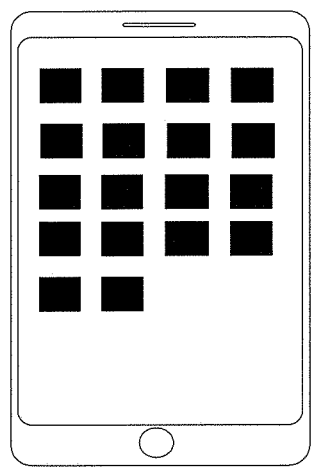
FIG. 2D is a schematic diagram according to another embodiment of the present invention, where content displayed on a screen is desktop icons.

Optionally, in this step, content displayed on the screen may be content that is arranged tightly and is very likely to cause a mistake in target selection. For example, as shown in FIG. 2A, the content displayed on the screen may be web page content; as shown in FIG. 2B, the content displayed on the screen may also be a menu list; as shown in FIG. 2C, the content displayed on the screen may also be entered content; as shown in FIG. 2D, the content displayed on the screen may also be desktop icons. Certainly, the content displayed on the screen may also be other content, which is not described herein.

Figure 3:
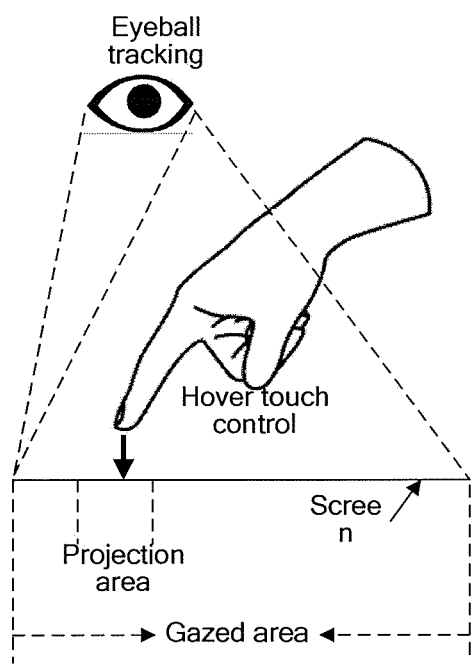
FIG. 3 is a schematic diagram, according to another embodiment of the present invention, of a gazed area generated by a terminal by means of eyeball tracking and a projection area generated by the terminal according to hover touch control of a gesture.

Optionally, when a user gazes at a target on a terminal screen with his/her eyeballs, a shooting apparatus of the terminal automatically captures a movement of the user's eyeballs to acquire a gazing direction of the user's eyeballs and generate a gazed area, for example, the gazed area shown in FIG. 3. The gazed area may be a to-be-matched selection area. According to different settings, the to-be-matched selection area may be or may not be displayed on the screen. The terminal, however, saves the to-be-matched selection area to further determine the target to be selected by the user.

Optionally, a threshold range of the gazed area may be an original slice range of an object such as a gazed interface, icon, and label. For example, an icon size of the internet work operating system (Internet work Operating System, IOS) is (120 pixels*120 pixels) and the threshold range of the gazed area is a slice size of the icon. Eyeball positioning is mainly used to preselect a gazed object and generate a gazed area.

Step 102. Detect the user's hover gesture operation of pressing the screen to acquire a projection area on the screen to be pressed by the user.

For example, when the user browses a web page on the terminal, the user places a finger above a to-be-selected target on the screen of the terminal to perform an operation, and a projection area is generated on the screen of the terminal, for example, the projection area shown in FIG. 3. The projection area may be a hover touch control selection area. A size of the hover touch control selection area may be (10 pixels*10 pixels), and the hover touch selection control area will virtually expand by 20% to 80%, which may help the user select a to-be-selected object more quickly.

Step 103. When the gazed area does not include the projection area, re-detect the user's hover gesture operation of pressing the screen to acquire the projection area on the screen to be pressed by the user.

Optionally, when the terminal determines whether the gazed area includes the projection area and acquires a determining result that the gazed area does not include the projection area, in a solution provided in the embodiment of the present invention, the unexpected application icon or function button may not be started. Then, the terminal re-detects the user's hover gesture operation of pressing the screen to acquire the projection area on the screen to be pressed by the user, until the determining result that the gazed area includes the projection area is acquired. For example, when the content displayed on the screen is a menu list, the user wants to start a music player to listen to music but the projection area acquired by a hover operation of the user points to another icon in the list, such as a video player. In this case, the gazed area of the user acquired by the eyeball positioning function does not include the projection area acquired by the gesture operation of the user, and the terminal will not start the video player pointed to by the projection area.

Compared with the prior art, where, in a situation in which a user taps by mistake and selects another application icon or function button on the terminal screen, the terminal will start the selected application icon or function button, and before the terminal re-detects the user's hover gesture operation of pressing the screen, the user needs to stop an application program corresponding to the application icon or the function button that is started by mistake, in the solution provided in the embodiment of the present invention, in the situation in which the user taps by mistake, the terminal does not start the selected application icon or function button but re-detects the user's hover gesture operation of pressing the screen, which simplifies an operation of selecting a target application icon or function button and makes the operation less time-consuming.

Step 104. When the gazed area includes the projection area, process the application icon or function button included in a match area.

Optionally, in this step, the match area is the projection area.

Optionally, when the terminal determines whether the gazed area includes the projection area and acquires the determining result that the gazed area includes the projection area, the terminal may acquire that the match area between the gazed area and projection area is the projection area, and the terminal will determine to start or execute content on the screen corresponding to the projection area.

For example, when the content displayed on the screen is a menu list, the user wants to start a music player to listen to music but the projection area acquired by a hover operation of the user points to a target icon in the list, which is the music player. If the gazed area of the user acquired by the eyeball positioning function includes the projection area of the user acquired by the gesture operation, the terminal start the music player pointed to by the projection area.

The embodiment of the present invention provides a positioning method, where, a gazed area on a screen under the gaze of a user can be acquired by detecting a screen gazing operation of the user; a projection area on the screen to be pressed by the user can be acquired by detecting the user's hover gesture operation of pressing the screen; and when the gazed area does not include the projection area, the user's hover gesture operation of pressing the screen is re-detected to acquire the projection area on the screen to be pressed by the user, and when the gazed area includes the projection area, an application icon or a function button included in a match area is processed. The embodiments of the present invention may simplify an operation of selecting a target application icon or function button and make the operation less time-consuming.

Figure 4:
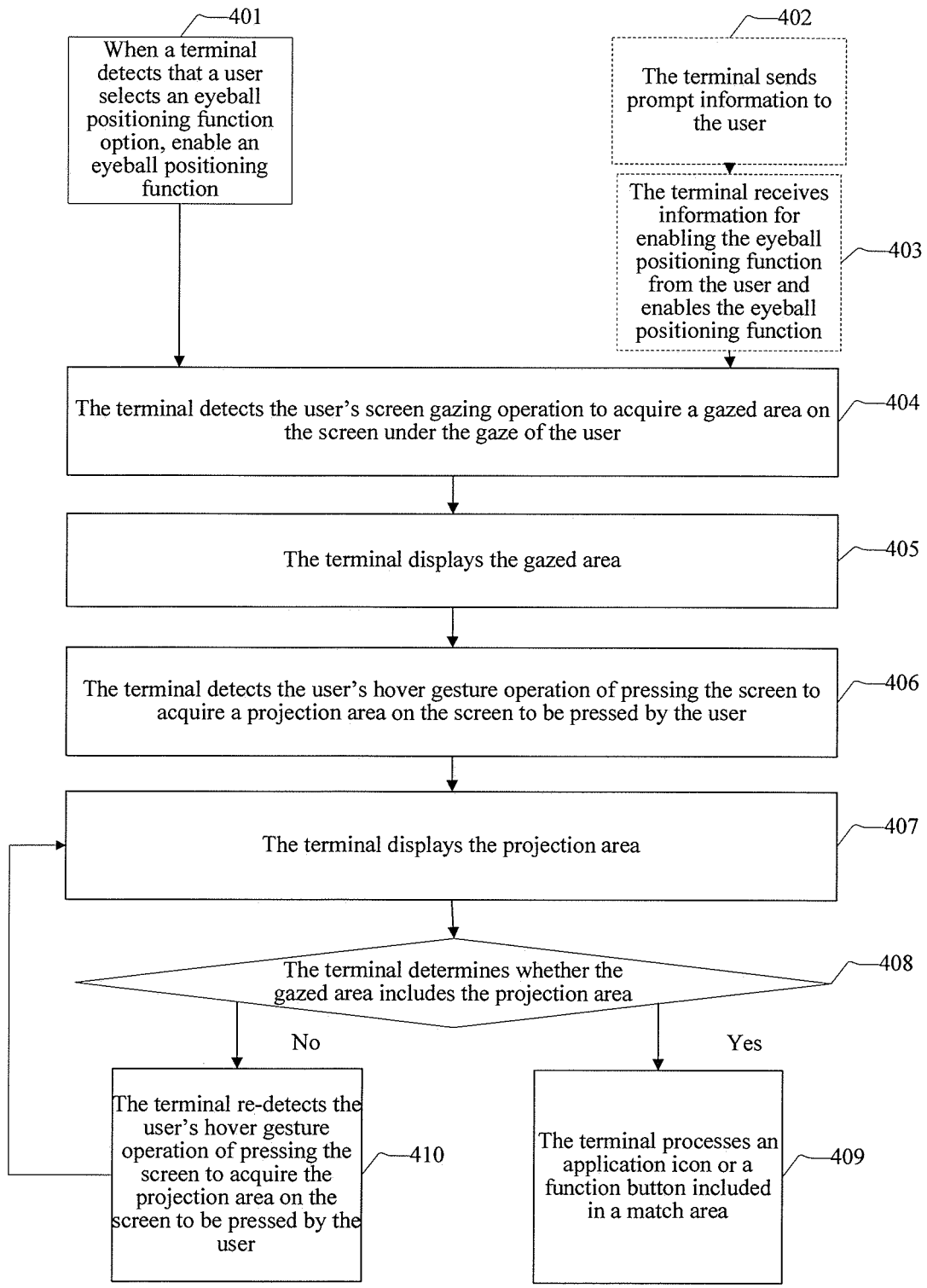
FIG. 4 is a flowchart of a positioning method according to another embodiment of the present invention.

An embodiment of the present invention provides a positioning method, as shown in FIG. 4, and the method includes:

Step 401. When a terminal detects that a user selects an eyeball positioning function option, enable an eyeball positioning function.

Optionally, when content displayed on a terminal screen is arranged tightly and is very likely to cause a mistake in operation, the eyeball positioning function of the terminal may be enabled. For example, when the content displayed on the screen is content such as a web page, an eBook, a menu list, or desktop icons, it may be regarded that the content is arranged tightly on the screen and the eyeball positioning function needs to be enabled.

Optionally, when the content displayed on the screen of a terminal is the content such as a web page, an eBook, a menu list, or desktop icons, it may be regarded that the content displayed on the screen is arranged tightly and the eyeball positioning function needs to be enabled. When the user enables the eyeball positioning function option and the terminal automatically detects that the eyeball positioning function option has been enabled, the terminal automatically enables the eyeball positioning function.

Step 402. The terminal sends prompt information to the user.

Optionally, the prompt information is used to prompt the user to enable the eyeball positioning function. In a situation in which the content displayed on the screen of the terminal is arranged tightly, the terminal automatically detects whether the eyeball positioning function option is enabled, and when acquiring a detection result that the eyeball positioning function option is not enabled, the terminal sends the prompt information to the user to prompt the user to enable the eyeball positioning function.

Step 403. The terminal receives information for enabling the eyeball positioning function from the user and enables the eyeball positioning function.

It should be noted that, the step 401 as well as the step 402 and step 403 are two parallel steps and represent two different manners of enabling eyeball positioning function. To enable the eyeball positioning function, only step 401 may be executed, or only step 402 and step 403 may be executed. In the figure, step 402 and step 403 are marked by dotted boxes to indicate that step 402 and step 403 are optional steps; certainly, step 401 may also be marked by a dotted box.

Step 404. The terminal detects the user's screen gazing operation to acquire a gazed area on the screen under the gaze of the user.

Optionally, this step is the same as step 101 in FIG. 1. For specific description, reference may be made to the description of step 101 and repeated description is not provided herein.

Step 405. The terminal displays the gazed area.

This step is an optional step. According to different settings, the terminal may display the gazed area on the screen, or may not display the gazed area on the screen. Nevertheless, the terminal still saves the gazed area.

Step 406. The terminal detects the user's hover gesture operation of pressing the screen to acquire a projection area on the screen to be pressed by the user.

Optionally, this step is the same as step 102 in FIG. 1. For specific description, reference may be made to the description of step 102 and repeated description is not provided herein.

Step 407. The terminal displays the projection area.

This step is an optional step. According to different settings, the terminal may display the projection area on the screen, or may not display the projection area on the screen. Nevertheless, the terminal still saves the projection area.

Step 408. The terminal determines whether the gazed area includes the projection area.

In this step, when the gazed area includes the projection area, step 409 is executed; when the gazed area does not include the projection area, step 410 is executed.

Step 409. The terminal processes an application icon or a function button included in a match area.

Optionally, this step is the same as step 104 in FIG. 1. For specific description, reference may be made to the description of step 104 and repeated description is not provided herein.

Step 410. The terminal re-detects the user's hover gesture operation of pressing the screen to acquire the projection area on the screen to be pressed by the user.

Optionally, when the terminal determines whether the gazed area includes the projection area and acquires a determining result that the gazed area does not include the projection area, in a solution provided in the embodiment of the present invention, the unexpected application icon or function button may not be started. Then, the terminal re-detects the user's hover gesture operation of pressing the screen to acquire the projection area on the screen to be pressed by the user, until the determining result that the gazed area includes the projection area is acquired. For example, when the content displayed on the screen is a menu list, the user wants to start a music player to listen to music but the projection area acquired by a hover operation of the user points to another icon in the list, such as a video player. In this case, the gazed area of the user acquired by the eyeball positioning function does not include the projection area acquired by the gesture operation of the user, and the terminal will not start the video player pointed to by the projection area.

Optionally, when the gazed area does not include the projection area, it indicates that the gazed area and the projection area do not match. In this case, the terminal re-detects the user's hover gesture operation of pressing the screen to acquire the projection area on the screen to be pressed by the user, and then re-executes the operations in step 407 to step 410, so as to accurately positioning the target to be selected by the user.

The embodiment of the present invention provides a positioning method, where, a gazed area on a screen under the gaze of a user can be acquired by detecting a screen gazing operation of the user; a projection area on the screen to be pressed by the user can be acquired by detecting the user's hover gesture operation of pressing the screen; and when the gazed area does not include the projection area, the user's hover gesture operation of pressing the screen is re-detected to acquire the projection area on the screen to be pressed by the user, and when the gazed area includes the projection area, an application icon or a function button included in a match area is processed. The embodiments of the present invention may simplify an operation of selecting a target application icon or function button and make the operation less time-consuming.

Figure 5:
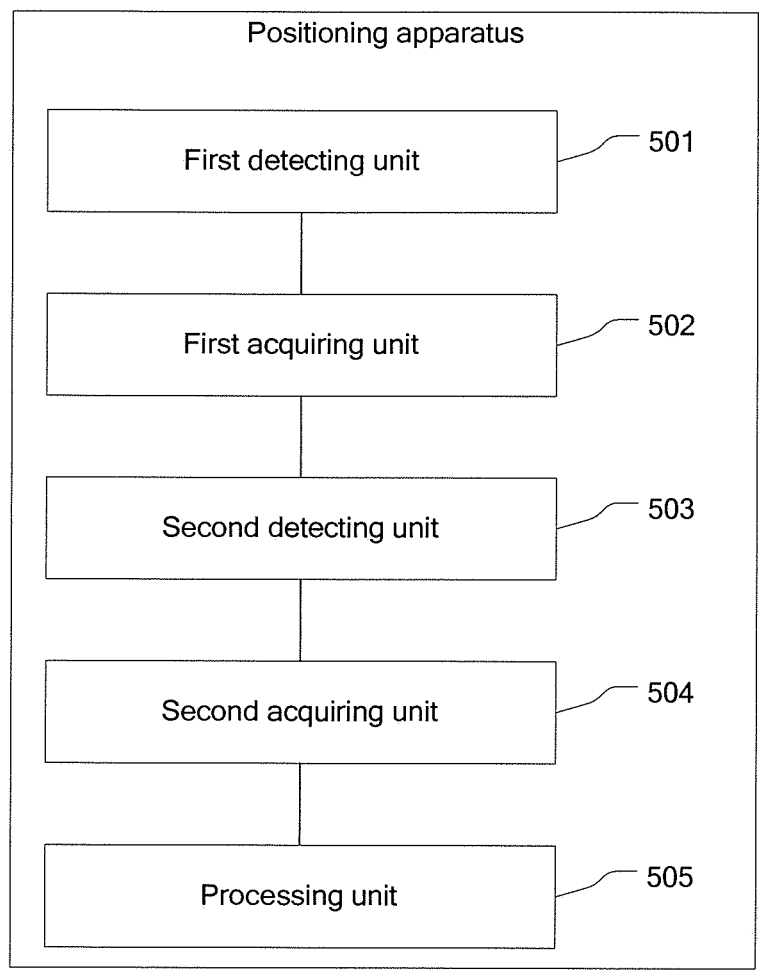
FIG. 5 is a block diagram of a positioning apparatus according to another embodiment of the present invention.

An embodiment of the present invention provides a positioning apparatus, as shown in FIG. 5, where the apparatus includes: a first detecting unit 501, a first acquiring unit 502, a second detecting unit 503, a second acquiring unit 504, and a processing unit 505.

The first detecting unit 501 is configured to detect a screen gazing operation of a user.

Optionally, in this step, content displayed on a screen may be content that is arranged tightly and is very likely to cause a mistake in target selection. For example, as shown in FIG. 2A, the content displayed on the screen may be web page content; as shown in FIG. 2B, the content displayed on the screen may also be a menu list; as shown in FIG. 2C, the content displayed on the screen may also be entered content; as shown in FIG. 2D, the content displayed on the screen may also be desktop icons. Certainly, the content displayed on the screen may also be other content, which is not described herein.

The first acquiring unit 502 is configured to acquire a gazed area on the screen under the gaze of a user.

Optionally, when a user gazes at a target on a terminal screen with his/her eyeballs, a shooting apparatus of the terminal automatically captures a movement of the user's eyeballs to acquire a gazing direction of the user's eyeballs and generate a gazed area, for example, the gazed area shown in FIG. 3. The gazed area may be a to-be-matched selection area. According to different settings, the terminal may or may not display the to-be-matched selection area on the screen. The terminal, however, saves the to-be-matched selection area to further determine the target to be selected by the user.

The second detecting unit 503 is configured to detect a user's hover gesture operation of pressing a screen.

The second acquiring unit 504 is configured to acquire a projection area of a screen to be pressed by a user.

Optionally, this step is the same as step 102 in FIG. 1. For specific description, reference may be made to the description of step 102 and repeated description is not provided herein.

The second detecting unit 503 is further configured to: when the gazed area does not include the projection area, re-detect the user's hover gesture operation of pressing the screen.

Optionally, when the terminal determines whether the gazed area includes the projection area and acquires a determining result that the gazed area does not include the projection area, in a solution provided in the embodiment of the present invention, the terminal does not start the unexpected application icon or function button but re-detects the user's hover gesture operation of pressing the screen.

The second acquiring unit 504 is further configured to acquire the projection area on the screen to be pressed by the user.

The processing unit 505 is configured to: when the gazed area includes the projection area, process an application icon or a function button included in a match area, where the match area is the projection area.

Optionally, this step is the same as step 104 in FIG. 1. For specific description, reference may be made to the description of step 104 and repeated description is not provided herein.

Figure 6:
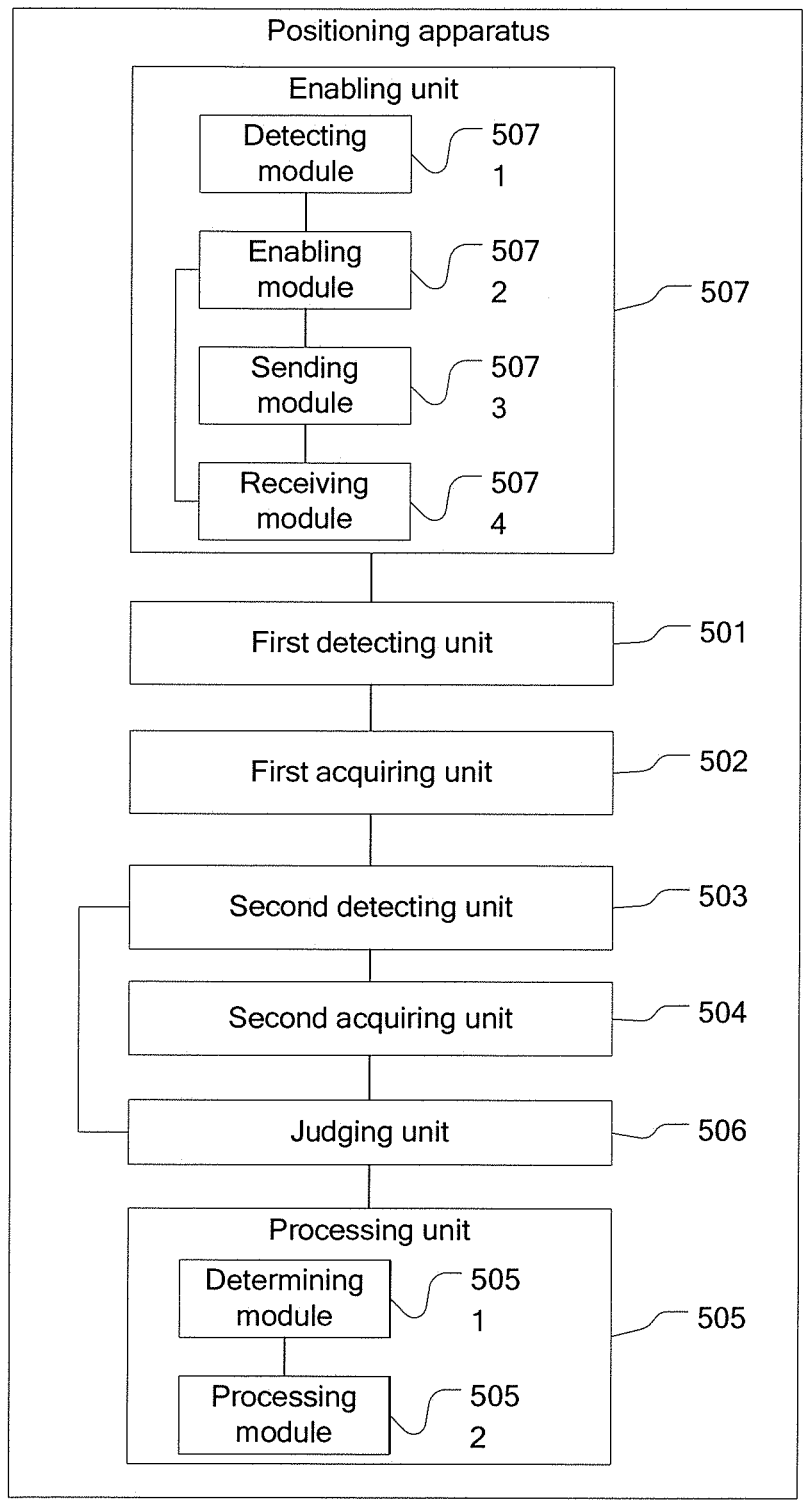
FIG. 6 is a block diagram of another positioning apparatus according to another embodiment of the present invention.

Further optionally, as shown in FIG. 6, the apparatus further includes a judging unit 506.

After the second acquiring unit 504 is configured to acquire the projection area on the screen to be pressed by the user, the judging unit 506 is configured to determine whether the gazed area includes the projection area.

Further optionally, the processing unit 505 includes a determining module 5051 and a processing module 5052.

The determining module 5051 is configured to: when the gazed area includes the projection area, determine, according to the match area, the corresponding application icon or function button in the match area.

The processing unit 5052 is configured to start an application program corresponding to the application icon, or display content corresponding to the function button.

Further optionally, the apparatus further includes an enabling unit 507.

Before the first detecting unit 501 is configured to detect the screen gazing operation of the user, the enabling unit 507 is configured to enable an eyeball positioning function, so as to acquire the gazed area of the user.

Further optionally, the enabling unit 507 specifically includes: a detecting module 5071, an enabling module 5072, a sending module 5073, and a receiving module 5074.

The detecting module 5071 is configured to detect that the user selects an eyeball positioning function option.

The enabling module 5072 is configured to enable the eyeball positioning function. Alternatively, the sending module 5073 is configured to send prompt information to the user, where the prompt information is used to prompt the user to enable the eyeball positioning function.

The receiving module 5074 is configured to receive information for enabling the eyeball positioning function from the user.

The enabling module 5072 is further configured to enable the eyeball positioning function.

It should be noted that: because content such as specific implementation processes of the various modules and information exchange between the various modules in the apparatus shown in FIG. 5 and FIG. 6 is based on a same invention concept as the method embodiment of the present invention, reference may be made to the method embodiment and repeated description is not provided herein.

The embodiment of the present invention provides a positioning apparatus, which: acquires, by detecting a screen gazing operation of a user, a gazed area on a screen under the gaze of the user, acquires, by detecting the user's hover gesture operation of pressing the screen, a projection area on the screen to be pressed by the user; re-detects, when the gazed area does not include the projection area, the user's hover gesture operation of pressing the screen to acquire the projection area on the screen to be pressed by the user; and processes, when the gazed area includes the projection area, an application icon or a function button included in a match area. The apparatus provided by the embodiment of the present invention may simplify an operation of selecting a target application icon or function button and make the operation less time-consuming.

Figure 7:
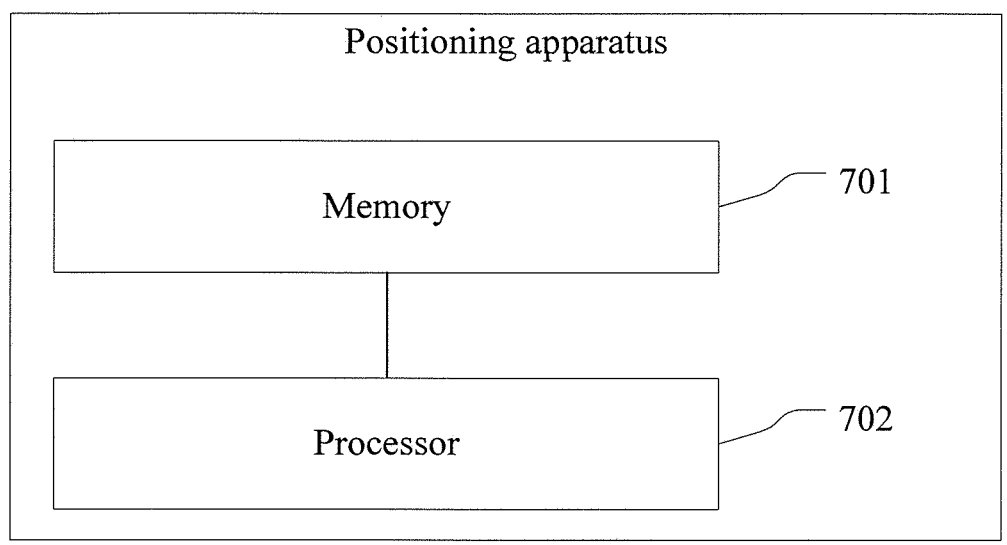
FIG. 7 is a block diagram of another positioning apparatus according to another embodiment of the present invention.

An embodiment of the present invention provides a positioning apparatus, as shown in FIG. 7, where the apparatus includes: a memory 701 and a processor 702.

The memory 701 is configured to store information including program routines.

The processor 702 is configured to couple with the memory 701 to control the execution of the program routines, which specifically includes: detecting a user's screen gazing operation to acquire a gazed area on a screen under the gaze of the user; detecting the user's hover gesture operation of pressing the screen to acquire a projection area on the screen to be pressed by the user; re-detecting, when the gazed area does not include the projection area, the user's hover gesture operation of pressing the screen to acquire the projection area on the screen to be pressed by the user; and processing, when the gazed area includes the projection area, an application icon or a function button included in a match area, where the match area is the projection area.

After detecting the user's hover gesture operation of pressing the screen to acquire the projection area on the screen to be pressed by the user, the processor 702 is further configured to determine whether the gazed area includes the projection area.

The processor 702 is configured to: when the gazed area includes the projection area, determine, according to the match area, the corresponding application icon or function button in the match area; and then start an application program corresponding to the application icon, or display content corresponding to the function button.

Before detecting the user's screen gazing operation to acquire the gazed area on the screen under the gaze of the user, the processor 702 is further configured to enable an eyeball positioning function, so as to acquire the gazed area, of the user.

The processor 702 is further configured to: when it is detected that the user selects an eyeball positioning function option, enable the eyeball positioning function; or, send prompt information to the user, where the prompt information is used to prompt the user to enable the eyeball positioning function; receive information for enabling the eyeball positioning function from the user, and enable the eyeball positioning function.

It should be noted that, because content such as specific implementation processes of various modules and information exchange between the various modules in the apparatus shown in FIG. 7 is based on a same invention concept as the embodiment of the present invention, reference may be made to the method embodiment and repeated description is not provided herein.

The embodiment of the present invention provides a positioning apparatus, which: acquires, by detecting a screen gazing operation of a user, a gazed area on a screen under the gaze of the user, acquires, by detecting the user's hover gesture operation of pressing a screen, a projection area on the screen to be pressed by the user; re-detects, when the gazed area does not include the projection area, the user's hover gesture operation of pressing the screen to acquire the projection area on the screen to be pressed by the user; and processes, when the gazed area includes the projection area, an application icon or a function button included in a match area. The apparatus provided by the embodiment of the present invention may simplify an operation of selecting a target application icon or function button and make the operation less time-consuming.

It should be noted that the described apparatus embodiment is merely exemplary. The units described as separate parts may or may not be physically separate, and parts displayed as units may or may not be physical units, may be located in one position, or may be distributed on a plurality of network units. A part or all of the modules may be selected according to an actual need to achieve the objectives of the solutions of the embodiments. A person of ordinary skill in the art may understand and implement the embodiments of the present invention without creative efforts.

Based on the foregoing descriptions of the embodiments, a person skilled in the art may clearly understand that the present invention may be implemented by software in addition to necessary universal hardware or by dedicated hardware only. The dedicated hardware includes an application-specific integrated circuit, an application-specific CPU, an application-specific memory, and an application-specific component. In most circumstances, the former is a preferred implementation manner. Based on such an understanding, the technical solutions of the present invention essentially or the part contributing to the prior art may be implemented in a form of a software product. The software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, or a network device) to perform the methods described in the embodiments of the present invention.

The embodiments of the present specification are described in a progressive manner. The same or similar parts of the embodiments can be referenced mutually. The focus of each embodiment is placed on a difference from other embodiments. Especially, for the apparatus and system embodiments, as they are fundamentally similar to the method embodiments, their description is simplified, and for relevant parts, reference may be made to the description of the method embodiments.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A positioning method, comprising:
   selectively enabling, by a terminal, an eyeball positioning function to acquire a gazed area of a user on a screen of the terminal when contents on the screen are arranged tightly;
   detecting, by the terminal, a screen gazing operation of the user to acquire the gazed area on the screen of the terminal under the gaze of the user;
   detecting, by the terminal, a user's hover gesture operation of pressing the screen of the terminal to acquire a projection area on the screen of the terminal to be pressed by the user;
   when the gazed area does not comprise the projection area, re-detecting, by the terminal, the user's hover gesture operation of pressing the screen of the terminal to acquire the projection area on the screen of the terminal to be pressed by the user; and
   when the gazed area comprises the projection area, processing, by the terminal, an application icon or a function button comprised in a match area, wherein the match area is the projection area.

2. The method according to claim 1, wherein, after detecting the user's hover gesture operation of pressing the screen to acquire the projection area on the screen to be pressed by the user, the method further comprises:
   expanding a size of the projection area by 20%-80% as compared to the hover gesture operation.

3. The method according to claim 1, wherein when the gazed area comprises the projection area, processing the application icon or the function button comprised in the match area, comprises:
   determining, according to the match area, the corresponding application icon or function button in the match area; and
   starting an application program corresponding to the application icon, or displaying content corresponding to the function button.

4. The method according to claim 1, wherein enabling the eyeball positioning function to acquire the gazed area of the user is also performed based on a user selection of an eyeball position function option.

5. The method according to claim 1, wherein the selectively enabling the eyeball positioning function comprises:
   sending prompt information to the user, wherein the prompt information is used to prompt the user to enable the eyeball positioning function; receiving information for enabling the eyeball positioning function from the user; and enabling the eyeball positioning function.

6. A positioning apparatus, comprising:
   a memory;
   a processor coupled to the memory; and
   a screen, wherein the positioning apparatus is configured to
   selectively enable an eyeball positioning function to acquire a gazed area of a user when contents on the screen are arranged tightly;
   detect a screen gazing operation of the user;
   acquire the gazed area on the screen under a gaze of the user;
   detect a user's hover gesture operation of pressing the screen;
   acquire a projection area on the screen to be pressed by the user, when the gazed area does not comprise the projection area, re-detect the user's hover gesture operation of pressing the screen, and
   acquire the projection area on the screen to be pressed by the user; and
   when the gazed area comprises the projection area, process an application icon or a function button comprised in a match area, wherein the match area is the projection area.

7. The apparatus according to claim 6, wherein the positioning apparatus is further configured to:
   determine whether the gazed area comprises the projection area.

8. The apparatus according to claim 6, wherein the positioning apparatus is further configured to:
   when the gazed area comprises the projection area, determine, according to the match area, the corresponding application icon or function button in the match area; and
   start an application program corresponding to the application icon, or display content corresponding to the function button.

9. The apparatus according to claim 6, wherein the positioning apparatus is further configured to:
   enable the eyeball positioning function to acquire the gazed area of the user based on a user selection of an eyeball position function option.

10. The apparatus according to claim 9, wherein the positioning apparatus is further configured to:
    send prompt information to the user, wherein the prompt information is used to prompt the user to enable the eyeball positioning function; and receive information for enabling the eyeball positioning function from the user, and further configured to enable the eyeball positioning function.

\* \* \* \* \*